(12) United States Patent
Harumoto et al.

(10) Patent No.: US 7,646,286 B2
(45) Date of Patent: Jan. 12, 2010

(54) STOLEN VEHICLE RECOVERY SUPPORT APPARATUS

(75) Inventors: Satoshi Harumoto, Hyogo (JP); Junichi Sawada, Hyogo (JP); Yoshihiko Maeno, Hyogo (JP); Hironori Nomori, Hyogo (JP); Yuusaku Matsuda, Hyogo (JP); Motohiro Nakamura, Okazaki (JP)

(73) Assignees: Fujitsu Ten Limited, Kobe-Shi (JP); Toyota Jidosha Kabushiki Kaisha, Toyota (JP)

(*) Notice: Subject to any disclaimer, the term of this patent is extended or adjusted under 35 U.S.C. 154(b) by 276 days.

(21) Appl. No.: 11/384,352

(22) Filed: Mar. 21, 2006

(65) Prior Publication Data

US 2006/0214779 A1 Sep. 28, 2006

(30) Foreign Application Priority Data

Mar. 23, 2005 (JP) ............................. 2005-084316

(51) Int. Cl.
*B60R 25/10* (2006.01)
(52) U.S. Cl. ............. 340/426.1; 340/425.5; 340/426.11
(58) Field of Classification Search ............... 340/426.1
See application file for complete search history.

(56) References Cited

U.S. PATENT DOCUMENTS

| | | | | |
|---|---|---|---|---|
| 5,396,215 A | * | 3/1995 | Hinkle | 340/426.17 |
| 5,939,975 A | * | 8/1999 | Tsuria et al. | 340/426.18 |
| 6,956,467 B1 | * | 10/2005 | Mercado, Jr. | 340/426.2 |
| 7,161,464 B2 | * | 1/2007 | Yuhara | 340/5.2 |
| 2002/0109587 A1 | * | 8/2002 | Attring et al. | 340/426 |
| 2002/0190873 A1 | * | 12/2002 | Flick | 340/988 |
| 2003/0128104 A1 | * | 7/2003 | Lessard et al. | 340/426.11 |
| 2004/0193342 A1 | * | 9/2004 | Sakai et al. | 701/36 |

FOREIGN PATENT DOCUMENTS

| | | |
|---|---|---|
| JP | A 2002-142323 | 5/2000 |
| JP | A-2001-247013 | 9/2001 |
| JP | A 2002-257013 | 9/2002 |
| JP | 2002-316617 | * 10/2002 |
| JP | A 2002-316617 | 10/2002 |
| JP | A 2003-157483 | 5/2003 |
| JP | A-2005-059838 | 3/2005 |

OTHER PUBLICATIONS

Protag systems Inc. Retail Security systems, (Internet Archive) http://web.archive.org/web/20021219092002/http://www.protagsystems.com/security-alarms.html, Dec. 19, 2002.*

* cited by examiner

*Primary Examiner*—Toan N Pham
*Assistant Examiner*—Kerri McNally
(74) *Attorney, Agent, or Firm*—Oliff & Berridge, PLC

(57) ABSTRACT

An apparatus for supporting recovery of the vehicle if the vehicle is stolen includes a determining unit that determines whether the vehicle is being stolen. A camera judges a state of the vehicle and an environment around the vehicle. When the determining unit determines that the vehicle is being stolen, a horn of the vehicle is automatically honked.

14 Claims, 4 Drawing Sheets

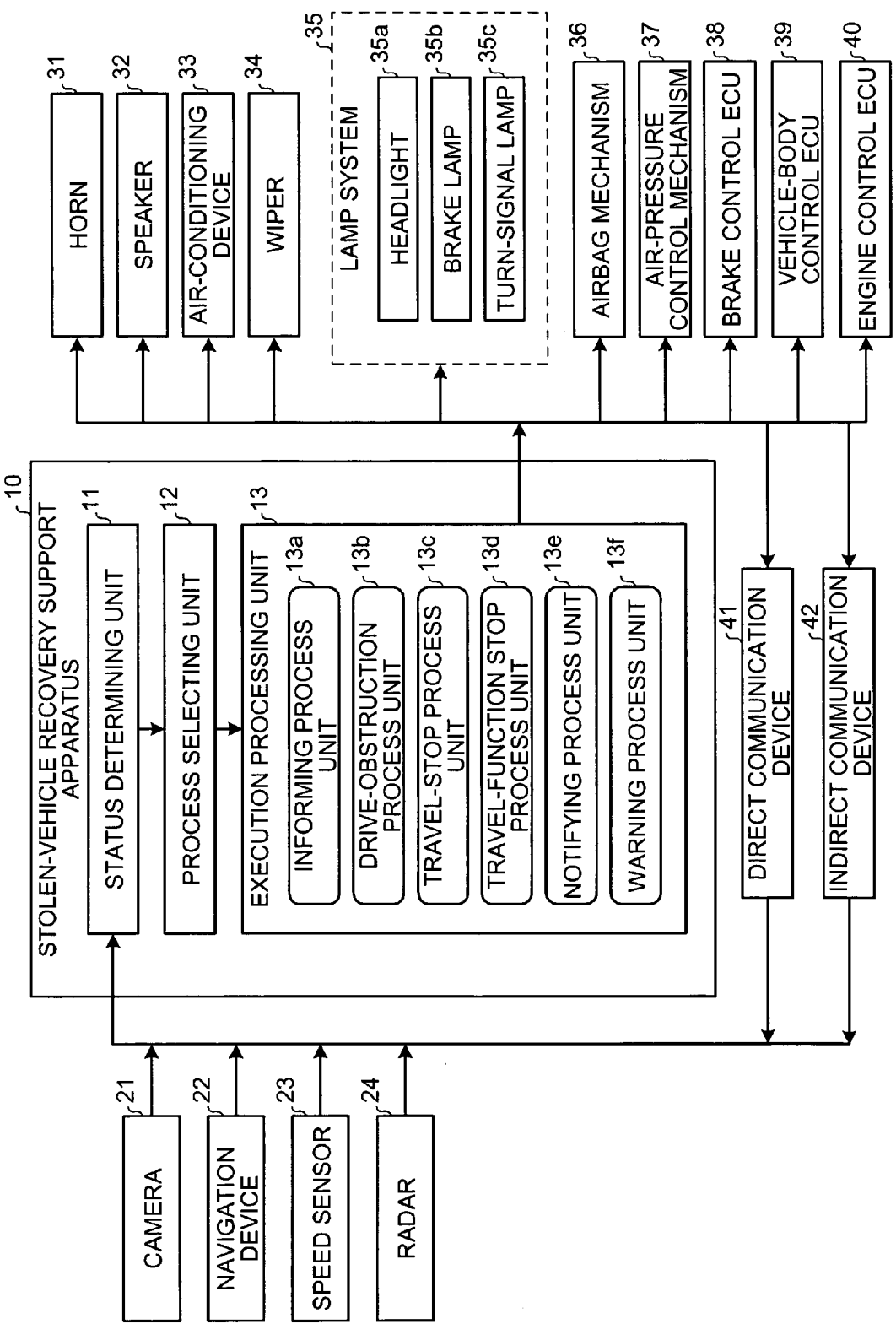

FIG.2

| RECOVERY SUPPORT APPARATUS | CONTENT OF PROCESS | PROCESS MEANS | STATUS OF APPLICATION |
|---|---|---|---|
| INFORM SURROUNDINGS | HONK HORN | HORN | |
| | SCREECH REAR BRAKE | BRAKE CONTROL ECU | |
| | OPEN WINDOW AND PLAY MUSIC AT FULL VOLUME | SPEAKER, VEHICLE-BODY CONTROL ECU | |
| | IRREGULARLY LIGHT LAMP SYSTEM | HEADLIGHT, BRAKE LAMP, TURN-SIGNAL LAMP | |
| OBSTRUCT DRIVING/ ENVIRONMENTAL SYSTEM | IRREGULARLY CONTROL WIPER | WIPER | |
| | IRREGULARLY CONTROL AIR CONDITIONING | AIR-CONDITIONING DEVICE | |
| / TRAVELING SYSTEM | DISABLING BRAKE | BRAKE CONTROL ECU | SAFE, STRAIGHT ROAD |
| | SUDDEN ACCELERATION | ENGINE CONTROL ECU | SAFE, STRAIGHT ROAD |
| | MAKE STEERING WHEEL HEAVY | POWER STEERING MECHANISM | SAFE CURVE |
| STOP TRAVEL | APPLY BRAKE | BRAKE CONTROL ECU | SAFE PLACE IN FRONT OF POLICE ATTRACT ATTENTION STOP POSITION INSTRUCTION FROM USER |
| | STOP ENGINE | ENGINE CONTROL ECU | |
| STOP TRAVEL FUNCTION | ECU LOCK/INITIALIZE | BRAKE CONTROL ECU, ENGINE CONTROL ECU | STOP VEHICLE |
| | DEPLOY AIRBAG | AIRBAG MECHANISM | |
| | DEFLATE TIRE | AIR PRESSURE CONTROL MECHANISM | |
| NOTIFY | SEND POSITION AND IMAGE TO CENTER OR POLICE | INDIRECT COMMUNICATION DEVICE | |
| WARN | WARNING FROM POLICE | INDIRECT COMMUNICATION DEVICE, SPEAKER | |

STOLEN VEHICLE RECOVERY SUPPORT APPARATUS

This application claims the benefit of Japanese Patent Application No. 2005-084316, filed on Mar. 23, 2005. The disclosure of the prior application is hereby incorporated by reference herein in its entirety.

BACKGROUND OF THE INVENTION

1. Field of the Invention

The present invention relates to a technology for recovering a stolen vehicle.

2. Description of the Related Art

There is known a technology for monitoring a vehicle and its surroundings while the driver is away from the vehicle to detect and prevent theft of a vehicle or theft of articles from a vehicle.

Japanese Patent Application Laid Open No. 2002-257013 discloses a technology for preventing auto theft by locking the engine with an immobilizer when theft is detected. Japanese Patent Application Laid Open No. 2003-157483 discloses a technology for photographing the surroundings of a vehicle when an object approaches the vehicle, and transmitting the photographed image when a fraudulent act is committed. Japanese Patent Application Laid Open No. 2000-142323 discloses a stolen-vehicle prevention device that sets off an alarm when theft is detected based on a change of a connection status of an anti-theft warning member incorporated in a junction box of, for example, an ignition key. Japanese Patent Application Laid Open No. 2002-316617 discloses a technology for recovering a stolen vehicle by deploying an airbag to obstruct a thief from driving the vehicle.

When a vehicle is stolen, the vehicle is in most cases driven or transported to be moved away from the original parking space. Most conventional technologies' attempts to interrupt theft of the vehicle before the vehicle is moved.

A stolen vehicle is not always used as is; its external and/or internal appearance is changed, or it is disassembled so that parts can be sold. Therefore, a stolen vehicle needs to be recovered quickly.

Moreover, a recovering means as disclosed in Japanese Patent Application Laid Open No. 2002-316617 is automatically activated, which might cause an adverse effect. Thus, there is a need to develop a technology for quickly and reliably recovering a stolen vehicle after the vehicle is moved away from the original parking space.

SUMMARY OF THE INVENTION

It is an object of the present invention to at least solve the problems in the conventional technology.

According to an aspect of the present invention, an apparatus provided in a vehicle for supporting recovery of the vehicle if the vehicle is stolen includes a determining unit that determines whether the vehicle is being stolen; a judging unit that judges a state of the vehicle and an environment around the vehicle; a plurality of supporting units each capable of executing a support processes to prevent theft of the vehicle; and a selecting unit that selects, when the determining unit determines that the vehicle is being stolen, at least one supporting unit among the supporting units to execute a corresponding support process according to a state of the vehicle judged by the judging unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic of a stolen-vehicle recovery support apparatus according to an embodiment of the present invention;

FIG. 2 depicts examples of recovery support processes executed by an execution processing unit shown in FIG. 1;

DETAILED DESCRIPTION OF THE PREFERRED EMBODIMENTS

Figure 3:
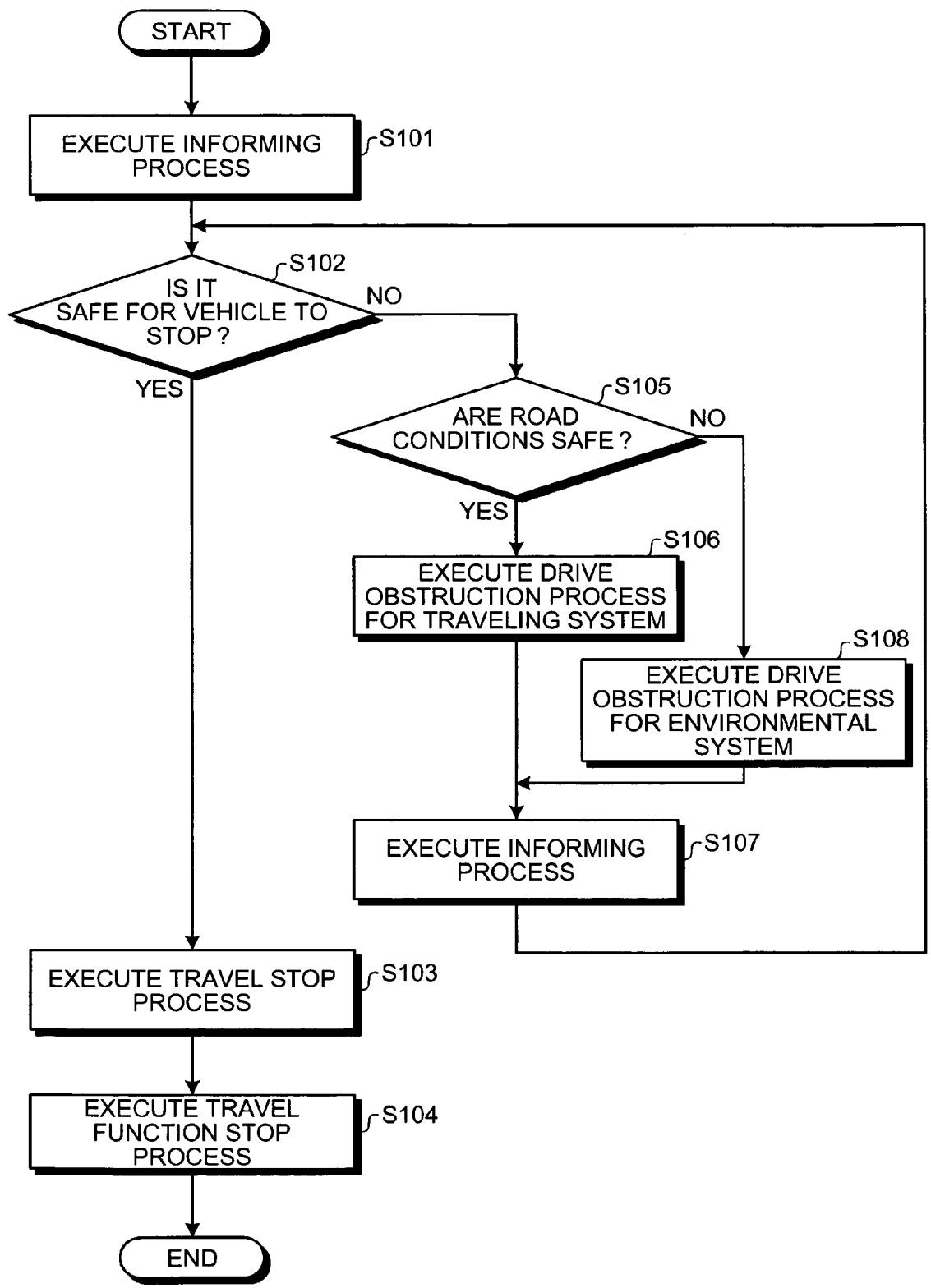
FIG. 3 is a flowchart of a processing procedure performed by the stolen-vehicle recovery support apparatus shown in FIG. 1.

Exemplary embodiments of the present invention will be described below with reference to accompanying drawings. The present invention is not limited to these embodiments.

FIG. 1 is a schematic of a stolen-vehicle recovery support apparatus 10 according to an embodiment of the present invention. The stolen-vehicle recovery support apparatus 10 is connected to a camera 21, a navigation device 22, a speed sensor 23, a radar 24, a horn 31, a speaker 32, an air-conditioning device 33, a wiper 34, a lamp system 35, an airbag mechanism 36, an air-pressure control mechanism 37, a brake control electronic control unit (ECU) 38, a vehicle-body control ECU 39, an engine control ECU 40, a direct communication device 41, and an indirect communication device 42.

The camera 21 photographs the surroundings and the interior of a vehicle in which the stolen-vehicle recovery support apparatus 10 is provided. The navigation device 22 sets a driving path and guides the vehicle. Specifically, the navigation device 22 acquires a present position of the vehicle by a global positioning system (GPS), identifies a road on which the vehicle is running from map data, and guides the vehicle with a display or a speaker. The navigation device 22 also outputs position information of the vehicle, map information of the surroundings, and time information to the stolen-vehicle recovery support apparatus 10.

The speed sensor 23 acquires rotation speed of a wheel of the vehicle, and calculates the speed of the vehicle. The radar 24 detects objects around the vehicle, in particular, a preceding vehicle and a succeeding vehicle.

The horn 31 is an alarm used for warning others of the presence of the vehicle. The speaker 32 outputs voice notifications to passengers of the vehicle. The speaker 32 is preferably shared by the navigation device 22 and an in-car audio system (not shown).

The air-conditioning device 33 air-conditions the inside of the vehicle, and the wiper 34 wipes the windshield of the vehicle in case of rain to clear the view for the driver. The lamp system 35 includes a headlight 35a for lighting the front of the vehicle, a brake lamp 35b for notifying others that the vehicle is decelerating, and a turn-signal lamp 35c for notifying others of the behavior of the vehicle.

The airbag mechanism 36 prevents a passenger from being injured by deploying an airbag in a case of a collision. The air-pressure control mechanism 37 controls air pressure of a tire.

The brake control ECU 38 puts a brake on the vehicle by controlling a brake. The vehicle-body control ECU 39 controls opening and closing of doors and windows. The engine control ECU 40 controls operations of the engine.

The direct communication device 41 directly communicates with a mobile terminal possessed by a user of the vehicle, such as a remote key terminal. The indirect communication device 42 communicates, via a network such as a telephone line or the internet, with a predetermined contact point such as the user's mobile phone, a security company, or the police.

The stolen-vehicle recovery support apparatus 10 includes a status determining unit 11, a process selecting unit 12, and an execution processing unit 13. The status determining unit 11 determines a status of the vehicle based on output from the camera 21, the navigation device 22, the speed sensor 23, the radar 24, the direct communication device 41, and the indirect communication device 42.

The process selecting unit 12 selects a process to be executed based on a determination result of the status determining unit 11, and the execution processing unit 13 executes the process selected. The execution processing unit 13 includes a plurality of recovery support units such as a notification system and a traveling system that has different prevention systems to each other. Specifically, the execution processing unit 13 includes an informing process unit 13a that informs the surroundings of theft, a drive-obstruction process unit 13b that obstructs a thief from driving the vehicle, a travel-stop process unit 13c that stops the vehicle from traveling, a travel-function stop process unit 13d that obstructs the vehicle from traveling by stopping a travel function of the vehicle, a notifying process unit 13e that notifies a status of the vehicle to a predetermined contact point, and a warning process unit 13f that warns a thief.

FIG. 2 depicts examples of recovery support processes executed by the execution processing unit 13. The informing process unit 13a informs the surroundings of theft by honking a horn, screeching a rear brake, opening a window and playing music at full volume, and irregularly lighting the lamp system, etc. These measures attract attention from surrounding people, so that a thief is discouraged from continuing to move the vehicle.

The process of honking a horn is executed by controlling the horn 31. The process of screeching the rear brake is executed by control of the brake control ECU 38. The process of opening a window and playing music at full volume is executed by forcibly opening a window of the vehicle by the vehicle-body control ECU 39 and forcibly outputting music at full volume from the speaker 32. The output sound can be music, e.g., irritating music, or a message such as "This is a stolen car. Call the police."

The lamp system is irregularly lighted to inform the surroundings that an abnormality has occurred by an irregular control that is not performed when the vehicle is traveling under regular circumstances. Specifically, the headlight 35a or the brake lamp 35b is blinked, or the turn-signal lamp 35c is irregularly lit.

The drive-obstruction process unit 13b executes a process of obstructing operation of an environmental system and a process of obstructing operation of the traveling system. The process of obstructing operation of an environmental system includes controlling a wiper to operate irregularly or controlling an air-conditioner to operate irregularly.

A wiper is controlled to operate irregularly by stopping operation of the wiper 34 in case of rain, operating the wiper 34 in fine weather, to deteriorate the view of the thief, and obstruct the thief from driving the vehicle. An air-conditioner is controlled to operate irregularly by operating the air-conditioning device 33 to turn on a heater under high temperature and turn on the cooler under low temperature.

The process of obstructing operation of the traveling system includes disabling the brake, sudden acceleration, and making the steering wheel heavy. The process of disabling the brake is executed when the status determining unit 11 determines that theft has occurred (or highly likely to occur) and that it is safe to disable the brake, to prevent an accident caused by executing this process.

For example, when it is determined that the vehicle is traveling on a straight road from the navigation device 22, there are no other vehicles in the surroundings from the camera 21 and the radar 24, and the vehicle is traveling at a predetermined speed or lower from the speed sensor 23, the status determining unit 11 interferes with the operation of the brake control ECU 38 and rejects to accept a brake operation from the thief. This process is preferably executed at a location where the brake is frequently operated, such as at a downward slope.

Similarly, the process of sudden acceleration is executed when the status determining unit 11 determines that theft has occurred (or highly likely to occur) and that it is safe to suddenly accelerate.

For example, when it is determined that the vehicle is traveling on a straight road from the navigation device 22, there are no other vehicles in the surroundings from the camera 21 and the radar 24, and the vehicle is traveling at a predetermined speed or lower from the speed sensor 23, the status determining unit 11 interferes with the operation of the engine control ECU 40, and autonomously and forcibly accelerates the vehicle.

The process of making the steering wheel heavy is performed, based on a determination result of the status determining unit 11, by stopping assistance of a power steering mechanism and making the driver operate the steering wheel without the assistance, without causing an accident when the vehicle is turning a curve.

A thief is obstructed from driving the vehicle by making the vehicle behave abnormally without causing an accident, and giving an impression to the thief that the vehicle is malfunctioning. Accordingly, the stolen-vehicle recovery support apparatus 10 can make a thief abandon stealing a vehicle for own usage or for resale.

The travel-stop process unit 13c stops a traveling vehicle by applying the brake or stopping the engine. To prevent an accident, the travel-stop process unit 13c stops the vehicle when the status determining unit 11 determines that it is safe to stop the vehicle.

A safe status to stop the vehicle is determined by acquiring a road shape from output of the navigation device 22, presence of other vehicles in the surroundings from the radar 24 and the camera 21, and the speed at which the vehicle is traveling from the speed sensor 23. The vehicle is preferably stopped in front of a police station or where attention can be attracted.

When it is safe to stop the vehicle, the brake control ECU 38 and the engine control ECU 40 is automatically controlled to forcibly stop the vehicle, and prohibit the brake from being released and the engine from being restarted, so that the vehicle cannot move.

Similarly, when the vehicle is stopped by operation of a thief, the brake control ECU 38 prohibits the brake from being released and the engine control ECU 40 prohibits the engine from being restarted, so that the vehicle cannot move.

The travel-function stop process unit 13d stops a travel function of the vehicle by locking/initializing ECU, deploying the airbag, or deflating a tire. Specifically, the ECU is locked/initialized by stopping access to a flash read-only memory (ROM) recording operations of the brake control ECU 38 and the engine control ECU 40, or deleting contents of the flash ROM, to disable the vehicle from traveling.

In the process of deploying the airbag, the airbag mechanism 36 is controlled to forcibly deploy the airbag so that a thief is obstructed from driving the vehicle. In the process of deflating a tire, the air-pressure control mechanism 37 is controlled so that air pressure in a tire is decreased to a level that the vehicle cannot travel.

By stopping the travel function, the vehicle is disabled from traveling until being handled by a serviceman. The stop process of the travel function is performed when the vehicle is in a stopped state.

The notifying process unit 13e uses the direct communication device 41 and the indirect communication device 42 to notify the user, an information center, a security company, or the police that theft has occurred. In the notifying process, the notifying process unit 13e sends position information of the vehicle acquired from the navigation device 22, an image of the surroundings of the vehicle and an image of the inside of the vehicle, photographed by the camera 21.

The notification destination is preferably selected based on certainty of theft. For example, if certainty is low, the theft is notified only to a user or an information center, and if certainty is high, the theft is notified to a security company or the police.

The notifying process unit 13e can prompt a user to determine whether the vehicle can be stopped by sending the user an image or position information. The user can send a request to the execution processing unit 13 to execute a stop process.

The warning process unit 13f warns a thief by using the indirect communication device 42 and the speaker 32. Specifically, a warning can be made when theft is likely to occur, or when there is a reply from the police in response to the notifying process.

When there is a reply from the police, the warning process unit 13f establishes a communication line between the police with the indirect communication device 42, so that the police can directly warn the thief, and make the thief abandon stealing the vehicle even more effectively.

The status determining unit 11 includes a theft determining function that determines that the vehicle has been stolen and a function of determining a status of the vehicle and an environment in which the vehicle is traveling. The status determining unit 11 communicates with a communication terminal held by a user, for example a remote key, through the direct communication device 41. If the remote key is outside the vehicle (or if communication cannot be established between the remote key) while the vehicle is traveling, the status determining unit 11 determines that theft might have occurred (low certainty of theft).

When a notification that theft has occurred is received from a user through direct communication with the remote key or indirect communication through a predetermined network, the status determining unit 11 determines that theft has occurred (high certainty of theft). Similarly, when the remote key is outside the vehicle (or if communication cannot be established between the remote key), and vehicle transporting equipment such as a tow car or a cargo transporter is detected near the vehicle, the status determining unit 11 determines that theft has occurred. When a door lock is destroyed, or when the engine is started without using a key, the status determining unit 11 determines that theft has occurred.

FIG. 3 is a flowchart of a processing procedure performed by the stolen-vehicle recovery support apparatus 10 when the status determining unit 11 determines that theft might have occurred or theft has occurred.

The process selecting unit 12 selects an informing process and the informing process unit 13a executes the informing process (step S101). The status determining unit 11 determines a traveling environment, that is, whether it is safe for the vehicle to stop (step S102). When the status determining unit 11 determines it is not safe to stop (No at step S102), the status determining unit 11 determines whether road conditions are safe (step S105). When the road conditions are safe (Yes at step S105), the drive-obstruction process unit 13b executes a drive obstruction process for the traveling system selected by the process selecting unit 12 (step S106). When the road conditions are not safe (No at step S105), the drive-obstruction process unit 13b executes a drive obstruction process for the environmental system selected by the process selecting unit 12 (step S108).

After the drive obstruction process (step S106 or S108) is executed, the informing process unit 13a executes an informing process selected by the process selecting unit 12 (step S107), and the system control returns to step S102.

When the status determining unit 11 determines it is safe to stop (Yes at step S102), the travel-stop process unit 13c executes a travel stop process selected by the process selecting unit 12 (step S103), the travel-function stop process unit 13d stops the travel function after the traveling stops (step S104), and the processing ends.

Thus, when there is a possibility that theft occurred, a plurality of recovery support processes are selected and executed. The recovery support processes include the notifying process, the drive obstruction process for the traveling system, the drive obstruction process for the environmental system, the informing process, the travel stop process, and the travel function stop process. Accordingly, recovery of a stolen vehicle can be supported by quickly, safely, and accurately stopping the vehicle, and obstructing the thief from continuing to drive the vehicle.

Figure 4:
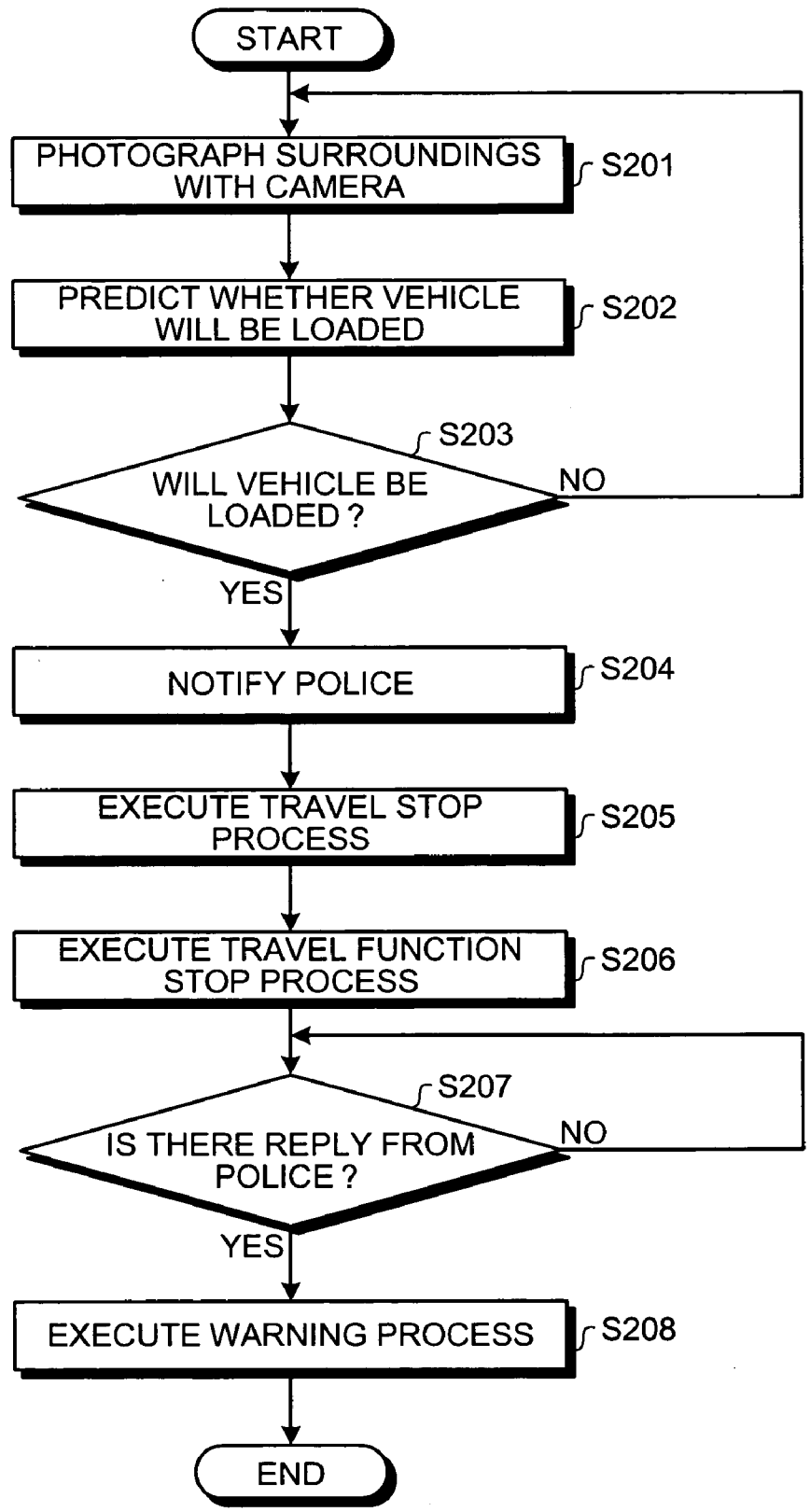
FIG. 4 is a flowchart of another processing procedure performed by the stolen-vehicle recovery support apparatus shown in FIG. 1.

When the vehicle is transported, the theft must be aborted before the vehicle is loaded in vehicle transporting equipment. When it is determined that theft might have occurred or theft has occurred, the stolen-vehicle recovery support apparatus 10 executes a processing procedure shown in a flowchart shown in FIG. 4, in addition to the processing procedure shown in FIG. 3.

The status determining unit 11 makes the camera 21 photograph the surroundings of the vehicle (step S201), and predicts whether there is a possibility that the vehicle will be loaded in vehicle transporting equipment based on whether vehicle transporting equipment is present in the surroundings (step S202).

When there is no possibility that the vehicle will be loaded in vehicle transporting equipment (No at step S203), the system control returns to step S201. When there is a possibility that the vehicle will be loaded in vehicle transporting equipment (Yes at step S203), the status determining unit 11 determines that theft has occurred. The notifying process unit 13e executes a notifying process to the police selected by the process selecting unit 12 (step S204).

The travel-stop process unit 13c executes a travel stop process selected by the process selecting unit 12 (step S205), and the travel-function stop process unit 13d executes a travel function stop process (step S206).

When there is a reply from the police (step S207), the warning process unit 13f executes a warning process (step S208), and the processing ends.

Thus, when it is predicted that the vehicle will be loaded in vehicle transporting equipment, it is determined that theft has occurred, and a travel stop process, a travel function stop process, and a warning process are executed before the vehicle is transported.

Thus, the stolen-vehicle recovery support apparatus 10 determines a status of the vehicle, selects and executes an appropriate process (notifying process, drive obstruction process for the traveling system, drive obstruction process for the environmental system, informing process, travel stop process, travel function stop process) to quickly stop the vehicle, obstructs the thief from continuing to drive the vehicle, and support recovery of the vehicle.

The configuration of the embodiment can be change appropriately. For example, the embodiment determines the status of the vehicle based on output from the camera 21, the navigation device 22, the speed sensor 23, the direct communication device 41, and the indirect communication device 42; however, output from other sensors can be used. Similarly, recovery support processes can be realized by any other control operation.

According to the above embodiment, recovery of a stolen vehicle can be appropriately supported. Furthermore, the thief is made to stop stealing the vehicle Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus provided in a vehicle for supporting recovery of the vehicle if the vehicle is stolen, the apparatus comprising:
   a determining unit that determines whether the vehicle is being stolen;
   a judging unit that judges a state of the vehicle and an environment around the vehicle based on criteria of safety or prevention of vehicle accidents, the environment including at least one of a shape of a path to be traveled by the vehicle and a presence of surrounding vehicles;
   a plurality of supporting units each capable of executing support processes to prevent theft of the vehicle; and
   a selecting unit that selects, when the determining unit determines that the vehicle is being stolen, at least one supporting unit among the supporting units to execute a corresponding support process according to a state of the vehicle and an environment around the vehicle judged by the judging unit,
   wherein the plurality of supporting units includes a notifying unit that sends a notification of a state of the vehicle to a predetermined contact point,
   wherein on a condition that the determining unit determines that a communication terminal held by a user of the vehicle is outside of the vehicle while the vehicle is traveling, the notifying unit sends the notification to the communication terminal or to an information center, and
   wherein on a condition that the determining unit determines that the vehicle is being stolen based on information received from the communication terminal, the notifying unit sends the notification to a security agency or to a police station.

2. The apparatus according to claim 1, wherein the supporting units include:
   an informing unit that informs surroundings of the vehicle that the vehicle is stolen;
   a drive-obstruction unit that provides control to enable driving of the vehicle;
   a travel-stop unit that provides control to stop the vehicle if the vehicle is moving;
   a travel-function stop unit that stops a travel function of the vehicle; and
   a warning output unit that outputs a warning.

3. The apparatus according to claim 2, wherein the informing unit executes at least one of:
   honking a horn;
   screeching a brake;
   opening a window of the vehicle and outputting sound from a speaker at full volume; and
   lighting a lamp system of the vehicle at a time when the lamp system would not normally be operated during standard operation of the vehicle.

4. The apparatus according to claim 2, wherein the drive-obstruction unit executes at least one of:
   controlling a wiper of the vehicle to operate at a time when the wiper would not normally be operated during standard operation of the vehicle; and
   controlling an air-conditioner of the vehicle to operate at a time when the air-conditioner would not normally be operated during standard operation of the vehicle.

5. The apparatus according to claim 2, wherein the drive-obstruction unit executes at least one of:
   refusing acceptance of a brake operation;
   causing the vehicle to suddenly accelerate; and
   discontinuing steering assistance, and
   the selecting unit selects the drive-obstruction unit to interfere with traveling of the vehicle when the judging unit judges that the vehicle is traveling and that there is no risk of an accident.

6. The apparatus according to claim 2, wherein
   the selecting unit selects the travel-stop unit to stop the vehicle from traveling when the judging unit judges that it is safe for the vehicle to stop, or when a thief stops driving the vehicle.

7. The apparatus according to claim 6, wherein
   the selecting unit selects the travel-stop unit to stop the vehicle from traveling when the judging unit judges that the vehicle is near a police station or at a location where attention can be attracted.

8. The apparatus according to claim 2, wherein
   the travel-function stop unit stops the travel function of the vehicle by disabling startup of a travel control device that controls travel of the vehicle.

9. The apparatus according to claim 2, wherein the notifying unit sends at least one of an image of the surroundings of the vehicle and an image of an interior of the vehicle or both together with the notification.

10. The apparatus according to claim 2, wherein
    the predetermined contact point is the police station, and
    the warning unit warns the thief when there is a reply from the police station in response to the notification.

11. The apparatus according to claim 1, wherein the selecting unit selects one of the plurality of supporting units in accordance with an instruction received from a user.

12. The apparatus according to claim 1, wherein the determining unit that determines that the vehicle is stolen when the judging unit detects vehicle transporting equipment near the vehicle.

13. The apparatus according to claim 1, wherein the environment includes both the shape of a path to be traveled by the vehicle and the presence of surrounding vehicles.

14. The apparatus according to claim 13, wherein the state of the vehicle includes a speed of the vehicle.

* * * * *